J. CONNELL.
Circular Sawing-Machine.
No. 210,100. Patented Nov. 19, 1878.
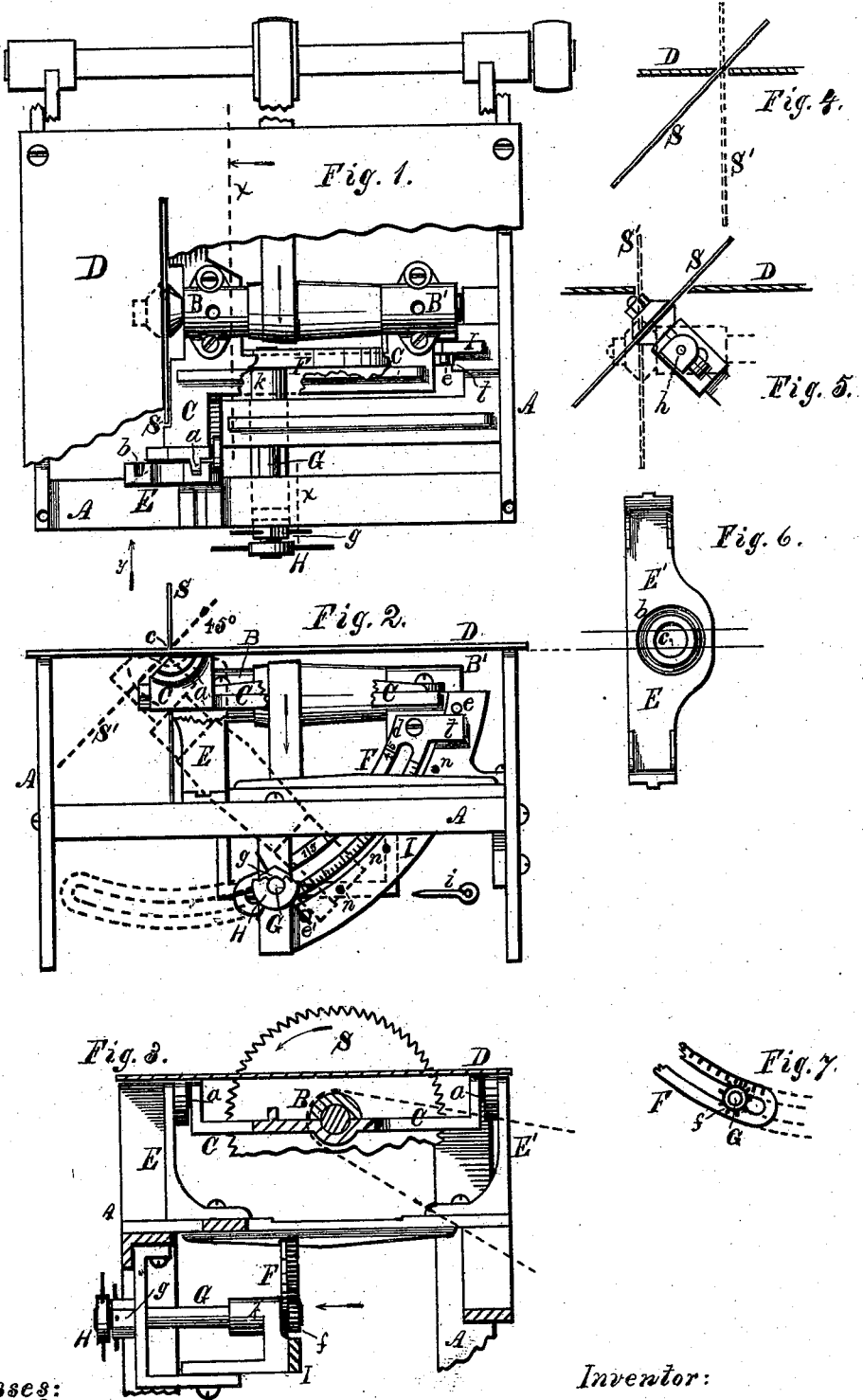
Witnesses:
W. L. Palmer
L. Phelps
Inventor:
John Connell
by E. B. Whitmore, Atty.

UNITED STATES PATENT OFFICE.

JOHN CONNELL, OF ROCHESTER, NEW YORK.

IMPROVEMENT IN CIRCULAR SAWING MACHINES.

Specification forming part of Letters Patent No. 210,100, dated November 19, 1878; application filed January 26, 1876.

*To all whom it may concern:*

Be it known that I, JOHN CONNELL, of Rochester, in the county of Monroe and State of New York, have invented a new and useful Improvement in Sawing-Machines, which improvement is fully set forth in the following specification, reference being had to the accompanying drawings.

Figure 1 is a plan view of my improved sawing-machine, most of the table being broken away to uncover the work beneath. Fig. 2 is a front elevation of the same, viewed as indicated by the arrow $y$ in Fig. 1. Fig. 3 is a vertical sectional elevation, sectioned on the dotted line $x$ in Fig. 1. Figs. 4, 5, 6, and 7 are auxiliaries, and will be explained as occasion requires.

The object of my invention is mainly to hang the saw-arbor of a tilting sawing-machine in such a manner that the pivotal or axial line of the tilting movement shall lie in the plane of the saw, also in or near the plane of the upper surface of the table, whereby the saw, while being tilted, has no lateral movement at the said line, or, in other words, does not materially change its place in the narrow slit in the table up through which it projects; also, the employment of a pinion and rack to conveniently tilt the saw, and stop-pins to limit the the angle of its inclination.

In the drawings, A is a frame of any convenient form, and S a circular saw, hung on an arbor in the ordinary manner. The said arbor rests in the bearings B and B′ of the hanger-frame C, which is located a short distance below the table D. In front and back of the saw, as shown in Fig. 3, the hanger-frame C bends upward to the table, and these upward-turned parts are provided with circular ribs or tongues $a$, which fit in corresponding circular grooves $b$ cut in the posts E and E′, which form the main supports for the hanger-frame C. The upper portion of the support or post E in Fig. 2 is broken away, so as to show the end of the hanger-frame C and the circular tongue $a$.

The slotted segment F is fastened to a projection of the box B′ at $d$, Fig. 2, extends downward, and receives the end of the shaft G, upon which the pinion $f$, Fig. 3, is keyed. The said pinion $f$ works into teeth formed on the upper bar of the slotted segment F, as shown in Figs. 3 and 7, and when the same is revolved by turning the hand-wheel H the saw is caused to tilt or incline away from a perpendicular, as shown at S′ in Fig. 2, the circular tongues $a$ sliding in the grooves $b$ as the end of the arbor at B′ is carried up or down.

By observing the degree-marks on the circular arc formed by the slotted segment F, the operator is enabled to incline the saw at any desired angle from a perpendicular up to and including forty-five degrees therefrom, which is considered the limit of utility. The slotted segment may be fastened at any point by tightening the clamping-nut $g$, which clamps the said segment between the pinion and box $k$, Fig. 3.

From Fig. 2 it will be seen that the axial or center line of this tilting movement is made to coincide with the geometrical line formed by the intersection of the plane of the table with the plane of the saw, the said line passing horizontally through the point $c$, away from the observer. This is the essential part of my invention, and is accomplished mechanically by placing the saw and the upper surface of the table so that they will correspond to the center-line upon which the circular tongues $a$ and grooves $b$ were turned.

I design to cast the supports or posts E and E′ in one piece, as shown at Fig. 6, and bore out the groove $b$ in a lathe, after which I cut the same in two across the middle by cutting away the stock equally on either side of the center $c$ to a distance therefrom equal to the thickness of the proposed table D. When the said posts are put in their places and the table laid thereon, its upper surface will coincide with the center-line $c$ of the tongues $a$ and grooves $b$, as aforesaid.

Tilting saws have heretofore been made in which the center-line of the tilting movement has been located some distance below the table and away from the plane of the saw, as shown at $h$ in Fig. 5. $h$ being the center of motion, it will be seen that a wide opening is necessarily cut through the table to accommodate the saw in its various positions, which opening at the side of the saw has to be covered by adjustable pieces moved into place and fastened each time the angle of the saw is changed. By comparing Fig. 5 with Fig. 4, which latter represents the saw in its extreme positions in my machine, the advantage of the same will be apparent, a narrow constant opening through the table being sufficient to accommodate the saw in any of its positions.

The stationary curved bar I, Fig. 2, and the slotted segment F are concentric with the circular tongues and grooves $a$ and $b$, and the former, I, forms a sort of a guide for the lug $t$ and box B', along either side of which they move as the saw is tilted.

$e$ and $e'$ are fixed stop-pins or studs projecting from the side of the guide-bar I, against which the lug $t$ strikes at the extremity of its throw in either direction. The said studs or stop-pins $e$ and $e'$ are designed to be so located that when the lug $t$ touches the former the saw will form a right angle with the table, and when it touches the latter it will incline at an angle of forty-five degrees therefrom.

In doing some kinds of work with these machines it is necessary to repeatedly bring the saw back to some one or more given angles of inclination after its position has been changed to do other work. To facilitate these adjustments, and to bring the saw accurately and rapidly to these desired angles of inclination, I employ a detached stop-pin, $i$, Fig. 2, which may be inserted in holes $n$ $n$, drilled in the guide-bar I at proper places, against which the lug $t$ may be brought.

The tongues and grooves $a$ and $b$ are made tapering, so the wear between them may be compensated for or taken up by moving the supports E and E' closer to the hanger-frame C, said supports being made adjustable for the purpose.

Trunnions might be used in place of the tongues and grooves $a$ and $b$, as described, upon which to pivot the hanger-frame C; but as they would necessarily project above the plane of the upper surface of the table, and be in the way, I prefer to use the tongues and grooves aforesaid.

I claim as my invention—

1. The circular-saw frame C, carrying the circular saw S, having the pivotal or axial line of its tilting movement in both the plane of the saw and the plane of the table, in combination with the supports E E', having circular V-shaped grooves, the saw-frame C, having circular V-shaped tongues fitting in said grooves, and frame A, substantially as shown and described.

2. The two corresponding and oppositely-placed adjustable supports E E' for the saw-frame, bolted to the frame A, but made movable thereon, provided with circular grooves $b$, as shown, in combination with said saw-frame and frame A, substantially as described, and for the purpose set forth.

3. The clamping device composed of shaft G, nut $g$, pinion $f$, and segment F, in combination with frame A and saw-frame C, substantially as set forth.

4. A tilting saw-frame, C, carrying the circular saw S, in which the supports are in the plane of the saw and on opposite sides thereof, substantially as shown, and for the purpose set forth.

5. The combination of the segment F, provided with a lug, $t$, segmental guide-bar I, provided with fixed and adjustable pins $e$, $e'$, and $i$, and pin-holes $n$, frame A, and saw-frame C, substantially as herein shown and described.

JOHN CONNELL.

Witnesses:
E. B. WHITMORE,
B. C. WILLIAMS.